(12) United States Patent
Rejal et al.

(10) Patent No.: US 10,311,099 B2
(45) Date of Patent: Jun. 4, 2019

(54) METHOD AND SYSTEM FOR 3D MODEL DATABASE RETRIEVAL

(71) Applicant: Rejal Limited, London (GB)

(72) Inventors: Seena Rejal, London (GB); Patrick Min, London (GB)

(73) Assignee: Rejal Limited, London (GB)

( * ) Notice: Subject to any disclaimer, the term of this patent is extended or adjusted under 35 U.S.C. 154(b) by 839 days.

(21) Appl. No.: 14/777,235

(22) PCT Filed: Mar. 14, 2014

(86) PCT No.: PCT/GB2014/000098
§ 371 (c)(1),
(2) Date: Sep. 15, 2015

(87) PCT Pub. No.: WO2015/008012
PCT Pub. Date: Jan. 22, 2015

(65) Prior Publication Data
US 2016/0063035 A1    Mar. 3, 2016

(30) Foreign Application Priority Data

Mar. 15, 2013  (GB) .................................. 1304711.3

(51) Int. Cl.
*G06F 16/00*  (2019.01)
*G06F 16/583*  (2019.01)
(Continued)

(52) U.S. Cl.
CPC ........ *G06F 16/5854* (2019.01); *G06F 16/335* (2019.01); *G06F 16/532* (2019.01);
(Continued)

(58) Field of Classification Search
CPC ......... G06F 17/30259; G06F 17/30277; G06F 17/30699
See application file for complete search history.

(56) References Cited

U.S. PATENT DOCUMENTS

2006/0012597 A1  1/2006  Chakraborty
2006/0114252 A1  6/2006  Ramani et al.
(Continued)

FOREIGN PATENT DOCUMENTS

EP    1788492 A1    5/2007
EP    2093714 A1    8/2009

OTHER PUBLICATIONS

Search Report received for United Kingdom Patent Application No. GB1304711.3, dated Sep. 22, 2014, 4 pages.
(Continued)

*Primary Examiner* — Dinku W Gebresenbet (57) ABSTRACT

The present invention relates to a computer-implemented method for 3D model database retrieval using a 3D model as a search input. The method converts the search input into a plurality of orthogonal 2D views; generates a signature for each 2D view; and then searches the 3D model database by comparing the plurality of generated signatures with signatures generated for each 3D model in the database. The signatures are compared with one another across at least two orthogonal rotations. A system for 3D model retrieval and a method and system for creating 3D model database are also disclosed.

17 Claims, 5 Drawing Sheets

(51) Int. Cl.
 *G06F 16/335* (2019.01)
 *G06F 16/532* (2019.01)
 *G06T 15/20* (2011.01)
 *G06F 17/30* (2006.01)
(52) U.S. Cl.
 CPC .. *G06F 17/30259* (2013.01); *G06F 17/30277* (2013.01); *G06F 17/30699* (2013.01); *G06T 15/20* (2013.01)

(56) References Cited

U.S. PATENT DOCUMENTS

| | | | | |
|---|---|---|---|---|
| 2008/0002635 | A1* | 1/2008 | Mosko | H04W 28/14 370/338 |
| 2008/0292164 | A1* | 11/2008 | Azar | A61B 5/0091 382/131 |
| 2008/0294404 | A1* | 11/2008 | Zauhar | G06F 19/708 703/11 |
| 2009/0040225 | A1 | 2/2009 | Wang et al. | |
| 2011/0103691 | A1* | 5/2011 | Yun | G06F 17/30247 382/190 |
| 2012/0158497 | A1* | 6/2012 | Knighton | G06F 17/30247 705/14.49 |
| 2013/0002646 | A1* | 1/2013 | Lin | G06T 7/0012 345/419 |

OTHER PUBLICATIONS

International Search Report received for International Patent Application No. PCT/GB2014/000098, dated Feb. 2, 2015, 3 pages.
"Rapid Prototyping", Wikipedia, retrieved on Sep. 14, 2015, 4 pages. Available at: https://en.wikipedia.org/wiki/Rapid_prototyping.

* cited by examiner

METHOD AND SYSTEM FOR 3D MODEL DATABASE RETRIEVAL

FIELD OF INVENTION

The present invention is in the field of 3D model database retrieval. In particular, but not exclusively, the present invention relates to a method and system for 3D model database retrieval using a 3D model as a search input.

BACKGROUND

The retrieval of data from databases using search inputs involves significant technical innovation. Many solutions to text-based searching and even image-based searching have been developed by companies such as Google™. In these cases, the search input for the text databases is text and the search input for Google™ Goggles™ are images.

However, one area of data search remains difficult to solve. This is the field of searching within databases comprising 3D data, in particular, databases comprising 3D models (shapes). It is further desirous to be able to retrieve from those databases 3D model results using a 3D model as a search input.

There exist several 3D model search systems, including VizSeek™, CADseek™, Shapespace™ and Princeton's 3D Model Search Engine. All of these methods attempt to normalize for orientation of the search input, either by re-orienting the model/image, or by making the shape signature rotation invariant.

For efficient matching, for each 3D model a "shape descriptor" (or "shape signature") is computed: a relatively small set of data that can be efficiently compared, but still represents sufficient characteristics of the shape such that dissimilar shapes have dissimilar descriptors. For an extensive overview of previous work in 3D shape retrieval, further information can be found in "A survey of content based 3D shape retrieval methods", by J. W. H. Tangelder and R. C. Veltkamp, 2007.

Because of the regular nature of CAD (Computer-Aided Design) models, previous work in CAD shape retrieval has focused on view-based methods: a 3D model is represented by a number of 2D views (projections). Individual 2D shape signatures are computed for these views, which are then compared as a set. The 2D signatures are usually based on a Fourier transformation of the image boundary (see, for example, the Ph.D. thesis "3D Model Retrieval" by D. V. Vranić, 2003 or "Visual Based 3D CAD Retrieval using Fourier Mellin Transform" by X. Li, 2008).

However, all current methods that use shape descriptors and 2D views remain ineffective for accurate matching. This is because those methods that use automated orientation normalisation have poor accuracy, and those that use rotation invariant methods result in sub-optimal matching due to the use of mechanisms such as the Fourier transform.

It is an object of the present invention to provide a system for 3D model database retrieval which overcomes the disadvantages of the prior art, or at least provides a useful alternative.

SUMMARY OF INVENTION

According to a first aspect of the invention there is provided a computer-implemented method for 3D model database retrieval using a 3D model as a search input, comprising:

converting the search input into a plurality of orthogonal 2D views;
generating a signature for each 2D view; and
searching the 3D model database by comparing the plurality of generated signatures with signatures generated for each 3D model in the database;
wherein the signatures are compared with one another across at least two orthogonal rotations.

The signatures may be generated using a signature generating method which may include processing the 2D view to generate a boundary contour 2D view.

The signature generating method may also include applying a distance transform function to the boundary contour 2D view to generate a distance transformed 2D view. The distance transform function may be a squared Euclidean distance transform (EDT) function.

Alternatively, the distance transform function may be an L1 function or a Euclidean distance transform (EDT) function.

The signature generating method may include a step of removing small components from the boundary contour 2D view. The step of removing small components may comprise: detecting connected components of background pixels which comprise a number of pixels below a predetermined threshold and replacing the background pixels within the detected connected components with object pixels.

Alternatively or in addition, the step of removing small components may comprise: detecting connected components of object pixels which comprise a number of pixels below a predetermined threshold and replacing the object pixels within the detected connected components with background pixels.

The signature generating method may include filtering the distance transformed 2D view using a filtering function such that distance values decay.

The filtering function may be exponential. Alternatively, the filtering function may be linear.

The distance transformed 2D view may be inverted before filtering, such that the zero distance values are set to a predetermined maximum value and the distance values decay to zero.

Distance values below a specific threshold may be set to zero.

Each 3D model in the database may include a plurality of signatures generated from orthogonal 2D views of that 3D model.

The plurality of generated signatures may be compared with the signatures for the 3D models in the database by: comparing each of the plurality of signatures of the search input with each of the plurality of signatures of a 3D model in the database across at least two orthogonal rotations; wherein the smallest distance value of the comparisons against the 3D model in the database is the distance between the search input and the 3D model in the database.

The search input may be converted into three orthogonal 2D views.

According to a further aspect of the invention there is provided a computer-implemented method for creating a 3D model database for use with the first aspect of the invention, comprising:

converting each of a plurality of 3D models into a plurality of orthogonal 2D views;
generating a signature for each 2D view; and
storing data for the plurality of generated signatures of each 3D model associated with each 3D model in a database.

According to a further aspect of the invention there is provided a system for 3D model database retrieval comprising:

processing circuitry configured to receive a 3D model as a search input, said processing circuitry being configured to process the search input by converting the search input into a plurality of orthogonal 2D views and generating a signature for each 2D view and configured to search the 3D model database by comparing the plurality of generated signatures with signatures generated for each stored 3D model in the database; wherein the signatures are compared with one another across at least two orthogonal rotations; and storage circuitry configured to retrieve data for a plurality of 3D models.

According to a further aspect of the invention there is provided a system for 3D model database creation comprising:

processing circuitry configured to access 3D model data of a plurality of 3D models, said processing circuitry being configured to process the 3D model data by converting each of the plurality of 3D models into a plurality of orthogonal 2D views and generating a signature for each 2D view; and storage circuitry configured to store a plurality of generated signatures of each 3D model associated with each 3D model in a database.

Other aspects of the invention are described within the claims.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS

The present invention provides a method and system for searching a database of 3D models using a 3D model as a search parameter.

The inventors have discovered that fast and accurate matching for most 3D model databases can be achieved by utilising a method of 3D model retrieval that assumes invariance up to multiples of 90 degree (orthogonal) rotation.

Figure 1:
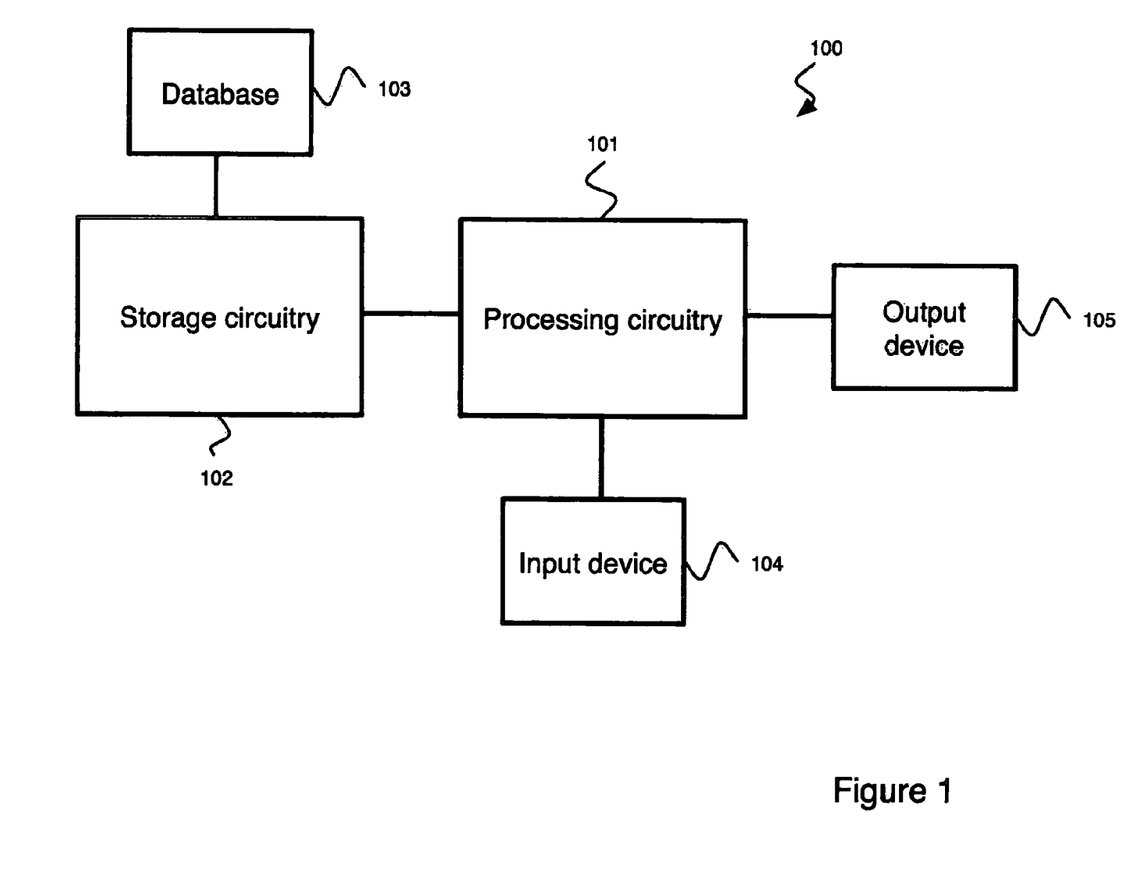
FIG. 1 shows a block diagram illustrating a system in accordance with an embodiment of the invention.

Referring to FIG. 1, a system 100 in accordance with the invention will be described.

The system 100 comprises processing circuitry 101 (a processor), storage circuitry 102, a database 103, an input device 104, and an output device 105.

The storage circuitry 102 may be configured to retrieve and store references to a plurality of 3D models and shape signatures for each 3D model within the database 103.

The input device 104 is configured to receive a 3D model, for example, from a storage under instruction from a user.

The processor 101 is configured to generate shape signatures for the received 3D model and to compare the shape signatures to shape signatures of the 3D models within the database 103 to find the 3D models most similar in shape to the received 3D model.

The shape signatures comprise three 2D signatures corresponding to three 2D orthogonal views or projections of the 3D model, along the primary (x, y, and z) axes.

The most similar 3D models may be output, for example to a user, via the output device 105.

Figure 2:
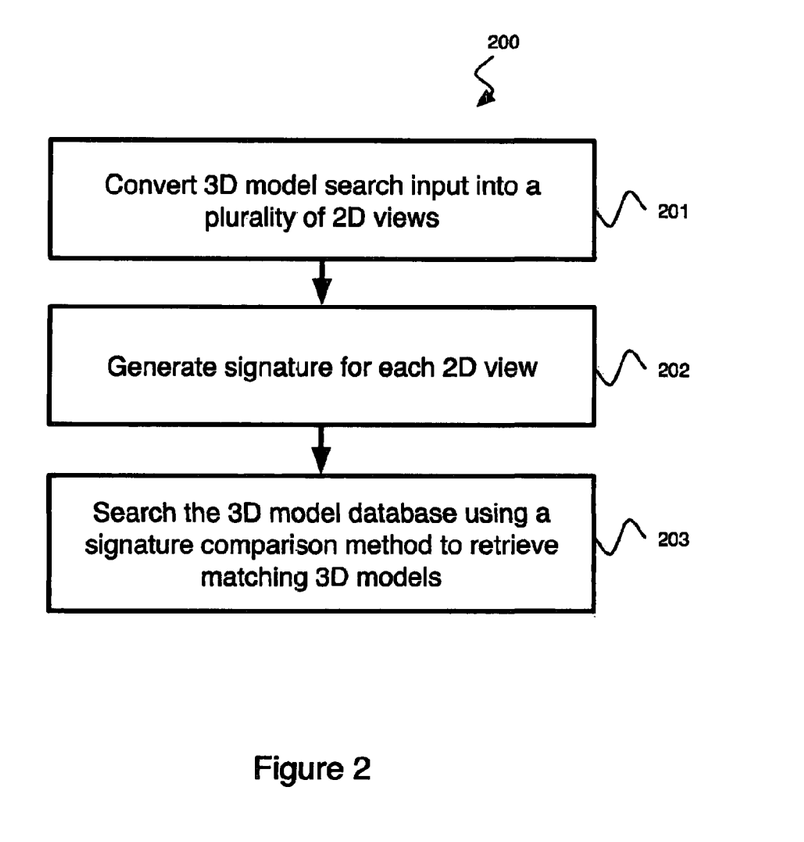
FIG. 2 shows a flow diagram illustrating a method in accordance with an embodiment of the invention.

Referring to FIG. 2, a method 200 in accordance with the invention will be described.

A 3D model to be used as the basis for a retrieval operation is provided as the search input via the input device. A shape signature is calculated for the search input 3D model.

The search input 3D model may be generated in any number of ways including:

1) Through CAD software on the user's computer;
2) On 'cloud-based' CAD platforms on the web (e.g. www.tinkercad.com);
3) On 'social CAD' platforms (e.g. www.grabcad.com);
4) Using apps and programs that stitch together mobile phone pictures to create a 3D model;
5) Using Kinect™ or webcam-based scripts for generating 3D models;
6) Using 3D scanners;
7) Auto-generated from a sketch or sketches; and
8) Piecing together basic geometric shapes.

The search input 3D model may be provided to the input device across a communications network. The search input may be provided via an API (application programming interface) or via an input apparatus located at the client side.

A shape signature comprises three 2D signatures, each 2D signature corresponds to a 2D orthogonal view (or projection) of the 3D model (along the x, y, and z axes). In other embodiments, only two orthogonal views are generated. Therefore, the 3D model is converted into a plurality of 2D orthogonal views in step 201 and a signature is generated for each view in step 202.

The resolution of the orthogonal views for the system may be predefined to specific resolution. For example, the views may be defined at 64×64 pixels. Higher resolutions will improve accuracy and lower resolutions will improve speed.

Figure 3:
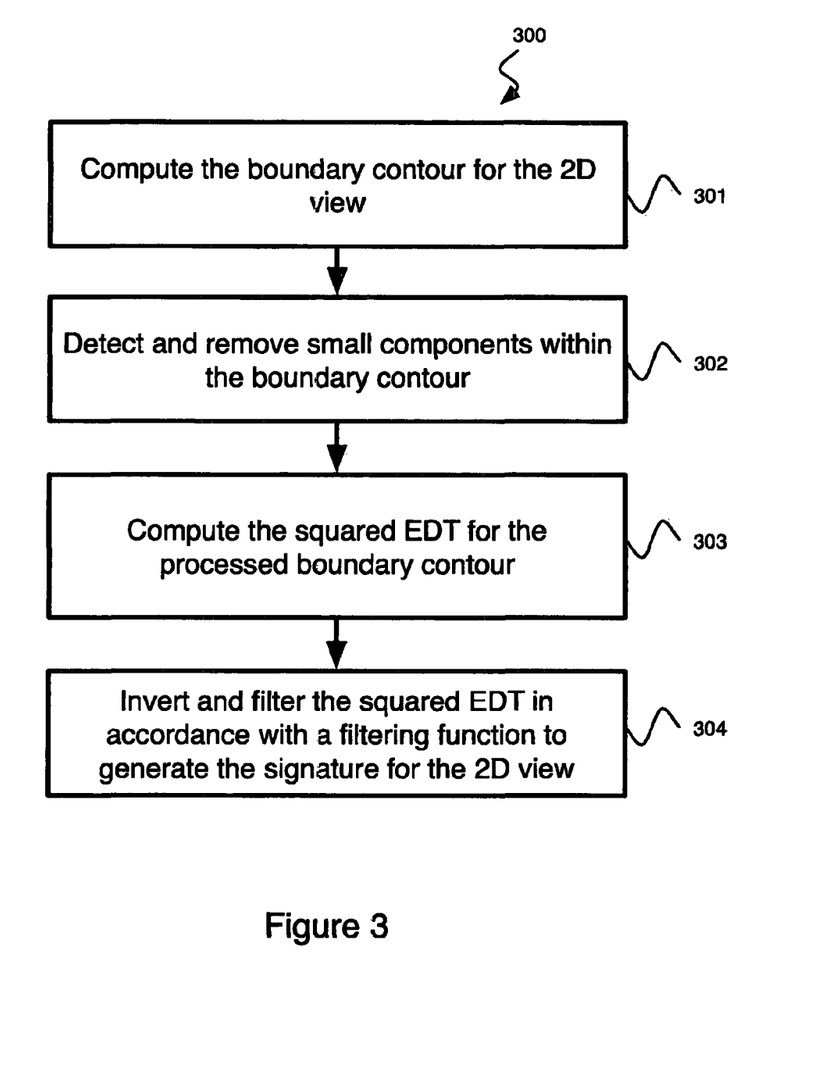
FIG. 3 shows a flow diagram illustrating a signature generation method in accordance with an embodiment of the invention.

An exemplary shape signature generation method 300 for step 202 will now be described with reference to FIG. 3.

Each 2D signature is calculated from its 2D view by the following steps:

In step 301, compute the boundary contour (outline) of the view. The contour may be defined as the pixels that are boundary pixels and boundary pixels may be calculated in accordance with the following: A pixel at (x, y), with x, y $\in$ {0, . . . , 63} for a 64×64 image, is considered to be a boundary pixel if at least 1 of the 4 pixels at (x−1, y), (x+1, y), (x, y−1), and (x, y+1) is a background pixel, or falls outside the boundaries of the image.

In step 302, detect and remove parts of the contour that enclose small components (for example, component comprising <=16 pixels in a 64×64 image). A component is defined as a maximal set of connected pixels. A pair of pixels is said to be connected it they are (1) both either an image (foreground) or background pixel, and (2) differ by exactly 1 in their x or y coordinate (but not both).

In step 303, compute the squared Euclidian Distance Transform (EDT) of the remaining contour. The squared Euclidean distance between two pixels at (x, y) and (m, n) is equal to $(x-m)^2+(y-n)^2$. The EDT provides a mechanism to measure how far boundaries are removed from those of another object (2D view boundary).

In one embodiment, only EDT values within the boundary are computed to generate values interior to the object. This may prevent over reduction of distance transform (DT) values when filtering and may avoid over-emphasis of exterior DT values for smaller views.

In step 304, invert and filter the EDT such that zero distance values are set to a certain maximum, and other distance values decay in accordance with an exponential falloff function, with pixels at a predefined distance or squared distance (far example, 5 pixels) and further set to zero (the EDT signature). With M the maximum squared distance, a squared EDT value $SE_{x,y}$ may be transformed using the following exponential falloff function:

$$\frac{1}{2^{SE_{x,y}/\sqrt{M}}} \cdot (M - SE_{x,y}) \wedge M - SE_{x,y} > 0$$
$$O \wedge M - SE_{x,y} \leq 0$$

The predefined distance (or squared distance) may be specified by a user to control the strictness of the match with a smaller distance resulting in a stricter match. For example, variation of this may control the level of "fuzziness" when matching 2D views: because it controls how close the view boundaries need to be in order for them to be considered "close". In one embodiment, a user could choose between three preset values, for example, shown as an "accurate", "medium", and "fuzzy" matching level.

In an alternative embodiment, the EDT is not inverted before filtering. This may place greater emphasis on structural features of the 2D image, since the most important (highest valued) pixels are those on the image's medial axis. Conversely, inverting prior to filtering it may place greater emphasis on the boundaries of the image In an alternative embodiment, the falloff function can be changed (to a linear function, for example), depending on the matching requirements (a linear function will result in less strict matching, for example).

In one embodiment, the object within the 2D view may be centred before the signature is generated. The object may be centred using the centre of mass of the object. This may reduce unwanted mismatches because of small protruding parts. In one embodiment, the influence of such parts may be removed completely by first sampling the 2D image and tallying distances to the centre of mass in a histogram. Values in histogram bins with a small percentage of samples are then discarded.

In an embodiment of the present invention, the signatures of the 3D models are compared with one another. Therefore, a squared EDT, rather than standard EDT, may be used to reduce computation time. It will be appreciated that standard EDT may be used, but that calculating square roots for the EDT will increase computation time. It will also be appreciated that a different distance transform may be used such as L1. Use of an alternative distance transform may change the accuracy of the matching. For example, the L1 transform will result in more flexible matching.

Figure 4:
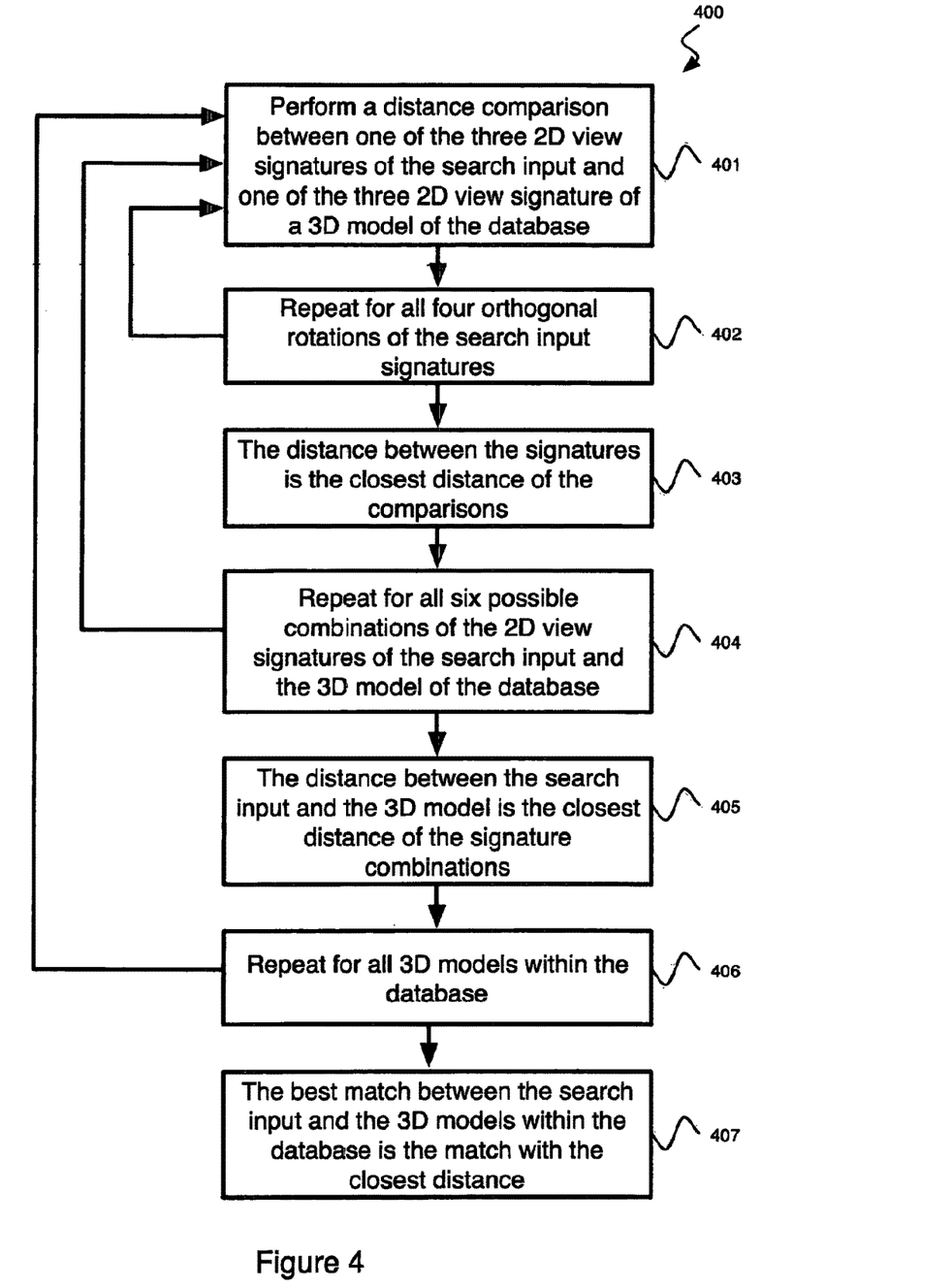
FIG. 4 shows a flow diagram illustrating a signature comparison method in accordance with an embodiment of the invention.

The shape signature of a 3D model is the set of three 2D EDT signatures of its 2D projections. An input shape signature is compared, using a comparison method 400 as shown in FIG. 4, to the shape signatures for the 3D models within the database to find the most similar 3D models in step 203. The shape signatures are compared by computing the Euclidean distance between all 6 possible correspondences between the two sets of three 2D signatures.

The signatures may be first processed for scale so that the signature distances are not influenced by the size of either 2D image. To process the signatures, the distances may be divided by the sum of all distance values in both signatures.

For each correspondence, in steps 401 and 402, four comparisons are done: one "as is", and three with the first signature rotated by 90, 180, and 270 degrees, respectively. The smallest distance value of these four comparisons is taken as the distance between the two EDT signatures in step 403.

In steps 404 and 405, the smallest total Euclidean distance out of the 6 correspondences is taken as the distance between the 3D models.

In steps 406 and 407, the 3D model within the database with the smallest distance between it and the input search model can be identified as the "closest" match.

It will be appreciated that the outcome of the above matching method may be appropriately weighted and combined with the appropriately weighted outcomes from one or more other classifiers to identify the "closest" match. For example, the shape matching results may be combined with text search results, or with a different shape matching method (one based on geometric features, or example).

The shape signatures for the 3D models within the database are preferably pre-computed and stored within the database. However, it will be appreciated that the shape signatures may be computed "on-the-fly". The shape signatures for the 3D models within the database are generated in accordance with the signature generation method as described in relation to FIG. 3.

In one embodiment, signatures for only two of 2D views of either or both of the 3D input search or 3D models within the database are used. The two views may be selected by eliminating the view with the least features (for example, a simple 2D view may comprise only a square or circle). The most featureless 2D view may be detected by traversing the boundary and counting the number of turns, for example.

In one embodiment, signatures are not compared directly, but the histograms of their values are compared. This may permit a comparison between the "bulkiness" of the 2D view without regard for the actual shape. This may be useful where the 2D view represents an object that can be articulated.

The 3D model retrieved from the database as a match, can be used to control the 3D manufacturing of the 3D model, for example, by additive manufacturing (3D printing). The 3D model may be represented by a data file, which is transmitted to an automated 3D printer for generating 3D objects.

In one embodiment, if there is no match, the original search input 3D model is used to generate a physical version of the 3D model.

Figure 5:
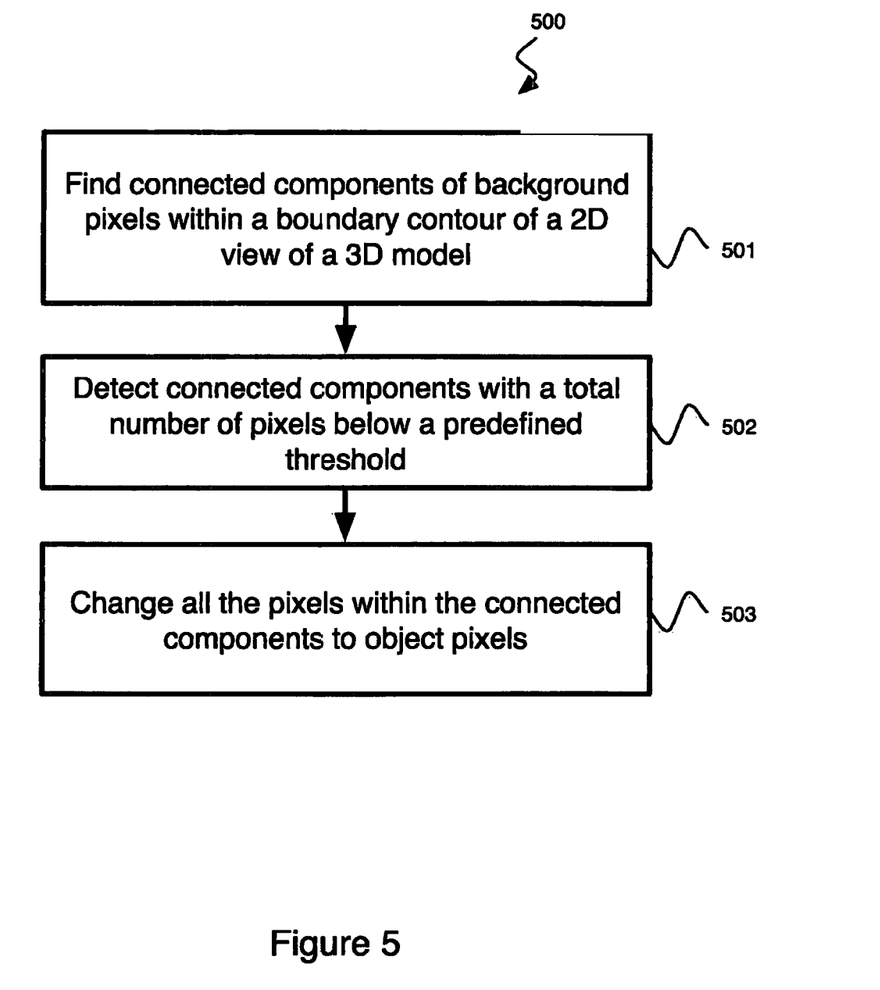
FIG. 5 shows a flow diagram illustrating a small components removal method in accordance with an embodiment of the invention.

A method 500 of detecting and removing small components will now be described with reference to FIG. 5.

In one embodiment, the 2D projections are black and white images where object pixels are white and background pixels are black.

In each 2D projection, all connected components, in step 501, of black pixels (background pixels) with less than a predefined threshold of pixels (such as 16 pixels) are detected in step 502.

In step 503, the pixels within those connected components are modified to white pixels (object pixels).

It will be appreciated that the present invention may be implemented as software executing on computer hardware or within hardware itself.

A potential advantage of some embodiments of the present invention is that the use of orthogonal comparisons reduces the need for computationally expensive and less accurate rotation invariant methods such as those that utilise Fourier transforms.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A computer-implemented method for 3D model database retrieval using a 3D model as a search input, comprising:
    converting the search input into a plurality of orthogonal 2D views;
    generating a signature for each 2D view using a signature generating method which includes:
        processing the 2D view to generate a boundary contour 2D view; and
        removing small components from the boundary contour 2D view by detecting connected components of background pixels which comprise a number of pixels below a predetermined threshold and replacing background pixels corresponding to the detected connected components with object pixels; and
    searching the 3D model database by comparing the plurality of generated signatures with signatures generated for each 3D model in the database;
    wherein the signatures are compared with one another across at least two orthogonal rotations.

2. A method as claimed in claim 1 wherein the signature generating method includes applying a distance transform function to the boundary contour 2D view to generate a distance transformed 2D view.

3. A method as claimed in claim 2 wherein the distance transform function is a squared Euclidean distance transform (EDT) function.

4. A method as claimed in claim 2 wherein the distance transform function is an L1 function.

5. A method as claimed in claim 2 wherein the distance transform function is a Euclidean distance transform (EDT) function.

6. A method as claimed in claim 2 wherein the signature generating method includes filtering the distance transformed 2D view using a filtering function such that distance values decay.

7. A method as claimed in claim 6 wherein the filtering function is exponential.

8. A method as claimed in claim 6 wherein the filtering function is linear.

9. A method as claimed in claim 6 wherein the distance transformed 2D view is inverted before the filtering, such that the zero distance values are set to a predetermined maximum value and during the filtering the distance values decay to zero.

10. A method as claimed in claim 9 wherein distance values below a specific threshold are set to zero.

11. A method as claimed in claim 6 wherein the filtering function is:

$$\frac{1}{2^{SE_{x,y}/\sqrt{M}}} \cdot (M - SE_{x,y}) \wedge M - SE_{x,y} > 0$$
$$0 \wedge M - SE_{x,y} \leq 0$$

where M is a squared threshold distance and wherein $SE_{xy}$ is the squared EDT value for a pixel at x,y.

12. A method as claimed in claim 1 wherein each 3D model in the database includes a plurality of signatures generated from orthogonal 2D views of that 3D model.

13. A method as claimed in claim 12 wherein the plurality of generated signatures are compared with the signatures for the 3D models of the database by:
    comparing each of the plurality of signatures of the search input with each of the plurality of signatures of a 3D model of the database across at least two orthogonal rotations;
    wherein the smallest distance value of the comparisons against the 3D model of the database is the distance between the search input and the 3D model of the database.

14. A method as claimed in claim 1 wherein the search input is converted into three orthogonal 2D views.

15. A method as claimed in claim 1 wherein a user providing the search input also defines a strictness level used within the method to determine a level of matching between the search input and the 3D models in the database.

16. A computer-implemented method for 3D model database retrieval using a 3D model as a search input, comprising:
    converting the search input into a plurality of orthogonal 2D views;
    generating a signature for each 2D view using a signature generating method which includes:
        processing the 2D view to generate a boundary contour 2D view; and
        removing small components from the boundary contour 2D view by detecting connected components of object pixels which comprise a number of pixels below a predetermined threshold and replacing the object pixels within the detected connected components with background pixels; and
    searching the 3D model database by comparing, across at least two orthogonal rotations, the plurality of generated signatures with signatures generated for each 3D model in the database.

17. A computer-implemented method for 3D model database retrieval using a 3D model as a search input, comprising:
    converting the search input into a plurality of orthogonal 2D views;
    generating a signature for each 2D view using a signature generating method which includes:
        processing the 2D view to generate a boundary contour 2D view;
        applying a distance transform function to the boundary contour 2D view to generate a distance transformed 2D view; and
        filtering the distance transformed 2D view using a filtering function:

$$\frac{1}{2^{SE_{x,y}/\sqrt{M}}} \cdot (M - SE_{x,y}) \wedge M - SE_{x,y} > 0$$

$$0 \wedge M - SE_{x,y} \leq 0$$

where M is a squared threshold distance and $SE_{x,y}$ is the squared EDT value for a pixel at x,y; and searching the 3D model database by comparing, across at least two orthogonal rotations, the plurality of generated signatures with signatures generated for each 3D model in the database.

\* \* \* \* \*